May 24, 1960 — F. M. COTTLE, JR — 2,937,708
SOUND DEADENING DEVICE
Filed March 20, 1958
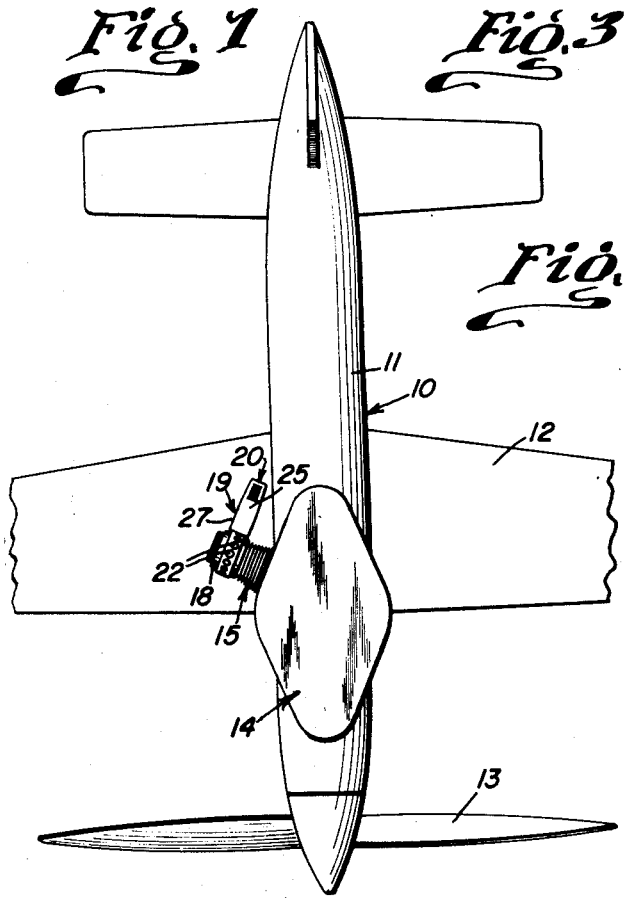

United States Patent Office
2,937,708
Patented May 24, 1960

2,937,708

SOUND DEADENING DEVICE

Francis M. Cottle, Jr., 4526 E. McKenzie Ave., Fresno, Calif.

Filed Mar. 20, 1958, Ser. No. 722,803

4 Claims. (Cl. 181—42)

This invention relates to a model aircraft, and more particularly to a sound deadening device or muffler for a model aircraft engine.

The object of the invention is to provide a device which is adapted to be connected to a model aircraft so that the usual noise or sound which results from operation of the model aircraft, will be minimized or eliminated so that the aircraft can be operated or flown with increased enjoyment or satisfaction.

Another object of the invention is to provide a muffler which will help eliminate objectionable motor noise that usually occurs when model aircraft are operated, and wherein the muffler of the present invention will not interfere with the efficiency of the aircraft or engine so that the aircraft can be used in the usual manner.

A further object of the invention is to provide a muffler for use with a model aircraft so that the aircraft can be flown in areas which are convenient to homes or other dwellings since the muffler of the present invention will eliminate the usual noises attendant to operation of the aircraft engines, so that the muffler of the present invention will permit the model aircraft to be operated or flown with increased pleasure or enjoyment, and wherein there will be no interference with operating efficiency of the engine or model aircraft.

A further object of the invention is to provide a sound deadening device or muffler for a model aircraft engine, which is extremely simple and inexpensive to manufacture.

These and other objects and advantages of the invention will be fully set forth in the following description made in connection with the accompanying drawing, in which like reference characters refer to similar parts throughout the several views, and in which:

Figure 1 is a fragmentary plan view of a model aircraft showing the muffler of the present invention connected thereto.

Figure 2 is an elevational view on an enlarged scale, showing the sound deadening device or muffler of the present invention.

Figure 3 is a view similar to Figure 2, but showing the sound deadening device removed.

Figure 4 is a sectional view taken on the line 4—4 of Figure 2.

Figure 5 is a view similar to Figure 4, but showing the parts in open position.

Figure 6 is an elevational view illustrating one of the body members of the clamp.

Referring in detail to the drawings, the numeral 10 indicates a portion of a conventional model aircraft or airplane which includes the main body portion or fuselage 11, wings 12, propeller 13, and engine or motor 14. Extending outwardly from the engine 14 is an exhaust pipe or exhaust cylinder 15, and the exhaust cylinder 15 may be made of a suitable material such as metal and includes spaced apart openings 16 and an annular outer groove or recess 17.

The present invention is directed to a muffler or sound deadening device for eliminating or minimizing the noise of operation of the aircraft engine, and it will be seen that the sound deadening device of the present invention includes a layer or strip of sound deadening material 18 which is adapted to surround the grooved portion 17 of the cylinder 15, and the layer 18 is adapted to extend over or cover the opening 16. For releasably holding the layer 18 on the cylinder 15, a releasable clamp 19 is provided.

As shown in the drawing, the clamp 19 includes a pair of similar body members 20 which are pivotally connected together, and each body member 20 includes an arcuate or curved jaw 21, the pair of jaws 21 being mounted for movement towards and away from each other. Each of the jaws 21 is provided with a plurality of spaced apart apertures or openings 22 which provide a partial exhaust means for the sound waves so as to help deaden the noise from the aircraft engine. Extending inwardly from each jaw 21 and secured thereto or formed integral therewith is a pair of spaced parallel curved flanges 23, and each of the flanges 23 is provided with a plurality of serrations or pointed teeth 24. These teeth 24 dig into or engage the sound deadening layer 18 when the parts are in the position shown in Figure 4 so as to prevent accidental movement of the layer 18, and wherein the layer or strip 18 will be maintained in its proper position on the cylinder 15.

Each of the body members 20 further includes a handle portion 25, and each handle portion 25 is provided with a pair of inwardly extending spaced parallel apertured ears 26. A pivot pin 27 pivotally connects the ears 26 together, and a spring member 28 is provided for normally urging the part from the position shown in Figure 5 to the position shown in Figure 4. The outer surfaces of the handle portions 25 are knurled or roughened as at 29 so as to facilitate manual manipulation of the clamp, as for example when the clamp is to be opened to the position shown in Figure 5.

From the foregoing, it is apparent that there has been provided a sound deadening device which is especially suitable for use on small engines such as model aircraft engines. According to the present invention, it will be seen that with the sound deadening device mounted on the exhaust cylinder or pipe 15, the noise resulting from operation of the engine 14 will be greatly reduced or muffled so that the model aircraft can be operated in populous neighborhoods or the like without causing annoyance to neighboring persons. While the present invention has been illustrated and described for use with a model aircraft engine, it is to be understood that the device can also be used on other types of equipment such as engines for operating small model boats or the like.

According to the present invention, the layer of sound deadening material 18 surrounds the grooved portion 17. With the layer of sound deadening material 18 surrounding the opening 16, and with the clamp 19 in the position shown in Figures 1, 2 and 4 for example, it will be seen that the layer 18 will be held in place on the cylinder 15. Then, as the aircraft is flown or operated, the sound waves will be deadened due to the provision of the layer of material 18 so that the model aircraft can be operated with greater enjoyment and wherein there will be less annoyance to neighbors who may object to the usual loud noise of such model aircraft.

It is to be noted that the clamp 19 consists of a pair of similar body members 20 which are pivotally connected together by means of a pin 27, and these body members are biased normally into the position shown in Figure 4 for example, by means of the spring member 28 so that the teeth 24 will dig into the layer 18 and thus hold the layer 18 in its proper position on the cylinder 15. Then, when it is desired to remove the clamp or layer, it is only necessary to manually apply pressure to the pair of handle portions 25, and the knurling 29 facilitates this manual handling of the portions 25. By squeezing on the handle portions 25, the pair of body members 20 will pivot on the pin 27 so that the pair of jaws 21 will move apart as shown in Figure 5 whereby the clamp 19 and layer 18 can be readily removed from the cylinder 15, for any desired purpose. The openings 22 provide exhaust ports so that some of the shock or sound waves can pass out through the opening 16 and then through the sound deadening material 18, and then through the openings 22, and the result of this arrangement is that the noise will be greatly minimized or eliminated.

The parts can be made of any suitable material and in different shapes or sizes.

The layer 18 is adapted to be made of a suitable material such as glass fiber and such material acts as a sound deadening or muffling material. Thus, the material 18 may be in the form of filaments of glass which are woven into yarn or into a woolly mass. The material 18 is sufficiently yieldable so that it will readily conform to the curvature of the cylinder 15.

It is to be noted that with the sound deadening device mounted on a model aircraft, it will be seen that such aircraft can be operated with increased pleasure and efficiency and satisfaction.

Most model aircraft operate on a mixture of fuel such as castor oil and alcohol, but an inexpensive efficient sound deadening device has not been previously available for such model aircraft. The clamp 19 holds the layer or lining 18 closely around the outer contour of the cylinder 15 and does not interfere with the operation of the engine. Thus, the glass fiber 18 deadens the sound and permits the engine to run efficiently. The serrations 24 keep the layer tight, and the layer 18, functions as a sound deadening material, but also permits the castor oil or other lubricant to be exhausted freely to the atmosphere. Since it is customary or frequently necessary to prime the model aircraft engines before starting the same, the clamp 19 can be readily removed from the cylinder so that priming fluid can be injected through the opening 16, and after the priming has been completed, the layer 18 is replaced and then the clamp 19 holds the layer of glass fiber 18 on the cylinder, before the engine is started so that it will be seen that the sound deadening device can be removed before the engine is to be primed, and then the sound deadening device is replaced on the cylinder before starting the engine.

The sound deadening device of the present invention will permit the model aircraft to be flown in any convenient location such as a person's backyard, since the usual noise will be eliminated or cut down. Thus, the muffler or sound deadening device will cut objectionable motor noise without interfering with motor efficiency, so that the model aircraft can be flown in a person's backyard without receiving complaints from neighbors or the like, and the size of the parts can be varied so that it will fit various sizes or shapes of small motors. The sound deadening device is of simple construction and will increase the amount of pleasure and enjoyment derived from the use of such model aircraft. It is to be noted that the layer 18 helps break up the shock waves or exhaust noises so that as the exhaust passes through the layer 18 and out through the openings 22, the usual noise will be greatly abated or cut down.

Minor changes in shape, size and rearrangement of details coming within the field of invention claimed may be resorted to in actual practice, if desired.

I claim:

1. In a model engine, an exhaust cylinder, a layer of sound deadening material arranged on said cylinder, a clamp for maintaining said layer of sound deadening material on said cylinder, said layer of material and clamp being selectively removable from the cylinder, said sound deadening material consisting of fine spun filaments of woven glass, said clamp including a pair of jaws mounted for movement towards and away from each other, teeth on said jaws for engagement with said layer of sound deadening material, manually operable handle portions for opening said jaws, and a spring member for normally maintaining said jaws in closed position.

2. In a model aircraft, an engine, an exhaust cylinder connected to said engine and said cylinder including a plurality of spaced apart openings and an annular groove, a layer of sound deadening material engaging said groove and surrounding said openings, and a releasable clamp for selectively maintaining the layer of material on said cylinder.

3. In a model aircraft, an engine, an exhaust cylinder connected to said engine and said cylinder including a plurality of spaced apart openings and an annular groove, a layer of sound deadening material engaging said groove and surrounding said openings, and a releasable clamp for selectively maintaining the layer of material on said cylinder, said clamp comprising a pair of body members each including an arcuate jaw, said jaws being mounted for movement towards and away from each other, spaced parallel curved flanges extending inwardly from each jaw, said flanges being each provided with a plurality of pointed teeth, each of said jaws being provided with a plurality of spaced apart apertures, each body member further including a handle portion, a pair of spaced parallel apertured ears extending inwardly from each handle portion, a pin pivotally connecting said ears together, and a spring member engaging said pin and handle portions for normally urging said jaws towards each other.

4. In a device of the character described for use with a model engine, a layer of sound deadening material, a clamp comprising a pair of body members each including an arcuate jaw, said jaws being mounted for movement towards and away from each other, spaced parallel curved flanges extending inwardly from each jaw, said flanges being each provided with a plurality of pointed teeth for engagement with the layer of sound deadening material, each of said jaws being provided with a plurality of spaced apart apertures, each body member further including a handle portion, a pair of spaced parallel apertured ears extending inwardly from each handle portion, a pin pivotally connecting said ears together, and a spring member engaging said pin and handle portions for normally urging said jaws towards each other, the outer surface of said handle portions being knurled.

References Cited in the file of this patent

UNITED STATES PATENTS

| | | |
|---|---|---|
| 1,115,704 | Manes | Nov. 3, 1914 |
| 1,360,311 | Padgett | Nov. 30, 1920 |
| 2,280,953 | Huntoon | Apr. 28, 1942 |
| 2,323,101 | Schirmer | June 29, 1943 |
| 2,593,054 | Reagan et al. | Apr. 15, 1952 |
| 2,618,499 | Scharf | Nov. 18, 1952 |